(12) United States Patent
Alam et al.

(10) Patent No.: US 7,571,118 B2  
(45) Date of Patent: *Aug. 4, 2009

(54) CONTROL SYSTEM INTERFACE FOR FLEXIBLE ORDER TRANSACTION SYTEM

(75) Inventors: Muhammad M. Alam, Santa Clara, CA (US); Ruediger Meyfarth, Heidelberg (DE); Sam S. Hwang, Los Altos, CA (US)

(73) Assignee: SAP AG, Walldorf (DE)

( * ) Notice: Subject to any disclaimer, the term of this patent is extended or adjusted under 35 U.S.C. 154(b) by 1024 days.

This patent is subject to a terminal disclaimer.

(21) Appl. No.: 10/850,814

(22) Filed: May 21, 2004

(65) Prior Publication Data

US 2005/0273375 A1 Dec. 8, 2005

(51) Int. Cl.  
*G06Q 30/00* (2006.01)

(52) U.S. Cl. .............................. 705/26; 705/1; 705/27; 705/28; 705/400

(58) Field of Classification Search ................ 705/26, 705/1, 27, 28, 400  
See application file for complete search history.

(56) References Cited

U.S. PATENT DOCUMENTS

| | | | |
|---|---|---|---|
| 6,023,683 A | 2/2000 | Johnson et al. | |
| 7,218,980 B1 * | 5/2007 | Orshansky et al. | ............ 700/99 |
| 2001/0027447 A1 | 10/2001 | Matsuura | |
| 2002/0069103 A1 | 6/2002 | Puri et al. | |
| 2002/0077979 A1 | 6/2002 | Nagata | |
| 2002/0099585 A1 | 7/2002 | Locke | |
| 2003/0200150 A1 * | 10/2003 | Westcott et al. | ............... 705/26 |
| 2004/0143488 A1 | 7/2004 | Wang | |
| 2005/0131779 A1 | 6/2005 | Kitamura et al. | |

FOREIGN PATENT DOCUMENTS

JP 2001154722 A 6/2001

* cited by examiner

*Primary Examiner*—Yogesh C Garg  
(74) *Attorney, Agent, or Firm*—Kenyon & Kenyon LLP (57) ABSTRACT

The present invention provides a control system interface for accessing a plurality of functions relating to a flexible order transaction system.

15 Claims, 7 Drawing Sheets

| Processed | Order | Product | Product Description | Start Date | Start Time | Avail. Date | Avail. Time | Del'd Strt | Del. Avail | Rcpt |
|---|---|---|---|---|---|---|---|---|---|---|
| | 55718 | GF_MAT_MTTAM | Material GF_MAT_MTTAM | 03/25/2002 | 01:30:00 | 03/25/2002 | 12:00:00 | 0.00 | 3.50 | |
| | 55949 | SK35_CONV_CAR | Convertible Car | | 08:00:00 | 03/25/2002 | 08:03:00 | 0.00 | 0.00 | |
| | 55954 | | Convertible Car | | 08:05:44 | 03/25/2002 | 08:08:44 | 3.66 | 3.66 | |
| | 55955 | | | | | 03/25/2002 | 08:08:44 | 0.00 | 0.00 | |
| | 55939 | JK_QA5_AUTOV3 | | | 08:12:00 | 03/25/2002 | 08:36:00 | 3.66 | 3.64 | |
| | 55957 | JSK35_CONV_CAR | Convertible Car | | 08:22:20 | 03/25/2002 | 08:25:20 | 0.00 | 0.00 | |
| | 55703 | SK36_CAR | Convertible Car-MTS example | | 11:57:00 | 03/25/2002 | 12:00:00 | 0.00 | 3.50 | |
| | 55723 | SK34_PHONE | Phone - MTO - Line | 03/27/2002 | 17:58:00 | 03/27/2002 | 18:00:00 | 0.00 | 1.25 | |
| | 55731 | | Phone - MTO - Line | | | 03/27/2002 | 18:00:00 | 0.00 | 1.25 | |
| | 55735 | | Phone - MTO - Line | | | 03/27/2002 | 18:00:00 | 0.00 | 0.00 | |
| | 55736 | | Phone - MTO - Line | | | 03/27/2002 | 18:00:00 | 0.00 | 0.00 | |
| | 56006 | JK_QA5_AUTOV3 | | 04/02/2002 | 08:24:00 | 04/02/2002 | 08:48:00 | 0.00 | 0.00 | |

Split
Merge
Change

CONTROL SYSTEM INTERFACE FOR FLEXIBLE ORDER TRANSACTION SYTEM

RELATED APPLICATIONS

This application incorporates by reference the following patents in their entirety: U.S. Pat. No. 7,409,351, entitled Method And System For Splitting An Order In A Flexible Order Transaction System, U.S. Pat. No. 7,464,038, entitled Method And System For Changing An Order In A Flexible Order Transaction System, U.S. Pat. No. 7,464,039, entitled Method And System For Merging Orders In A Flexible Order Transaction System, and U.S. Pat. No. 7,363,238, entitled Method And System For Cost Integration In A Flexible Order Transaction System.

FIELD OF THE INVENTION

The present invention relates to information systems and computer interfaces. In particular, the present invention provides a method and system for a user interface allowing access to unique features of a flexible order system. In one embodiment of the present invention, the flexible order system relates to a shop floor manufacturing system controlling an already in progress production order.

BACKGROUND OF THE INVENTION

Modern enterprise business software systems may provide among other services functions for Supply Chain Monitoring, Supply Chain Collaboration, Demand Planning, Supplier Network Planning, Multilevel Supply and Demand Matching, Global ATP ("Available to Production"), Production Planning, Transportation Training and Vehicle Scheduling, Maintenance and Service Training, Master Data and Administration Functions. These services may be made available from a single software application, which is referred to herein as an APO ("Advanced Planning Optimizer"). Associated with an APO is a set of tables containing business data. These tables may be accessed by functions provided by the APO.

With respect to production planning, as production and manufacturing cycles become more complex, it becomes apparent that the software must provide services for tracking these complex transactions and allow for flexible transaction processing. Particularly for certain complex environments such as the semiconductor industry it is often necessary to accommodate highly complex order splits, merges and changes.

In addition to providing functions to handle complex split, merge and change requirements, it would be beneficial to provide access to these services in a convenient manner such as through a convenient user interface such as graphical user interface ("GUI"). This is particularly apparent, as it is often necessary to access these functionalities from an industrial environment.

SUMMARY OF THE INVENTION

The present invention provides a user interface for accessing and implementing a set of split, merge and change functionalities via a graphical user interface, through a supply-chain management system or through an application programming interface.

DETAILED DESCRIPTION

Figure 1:
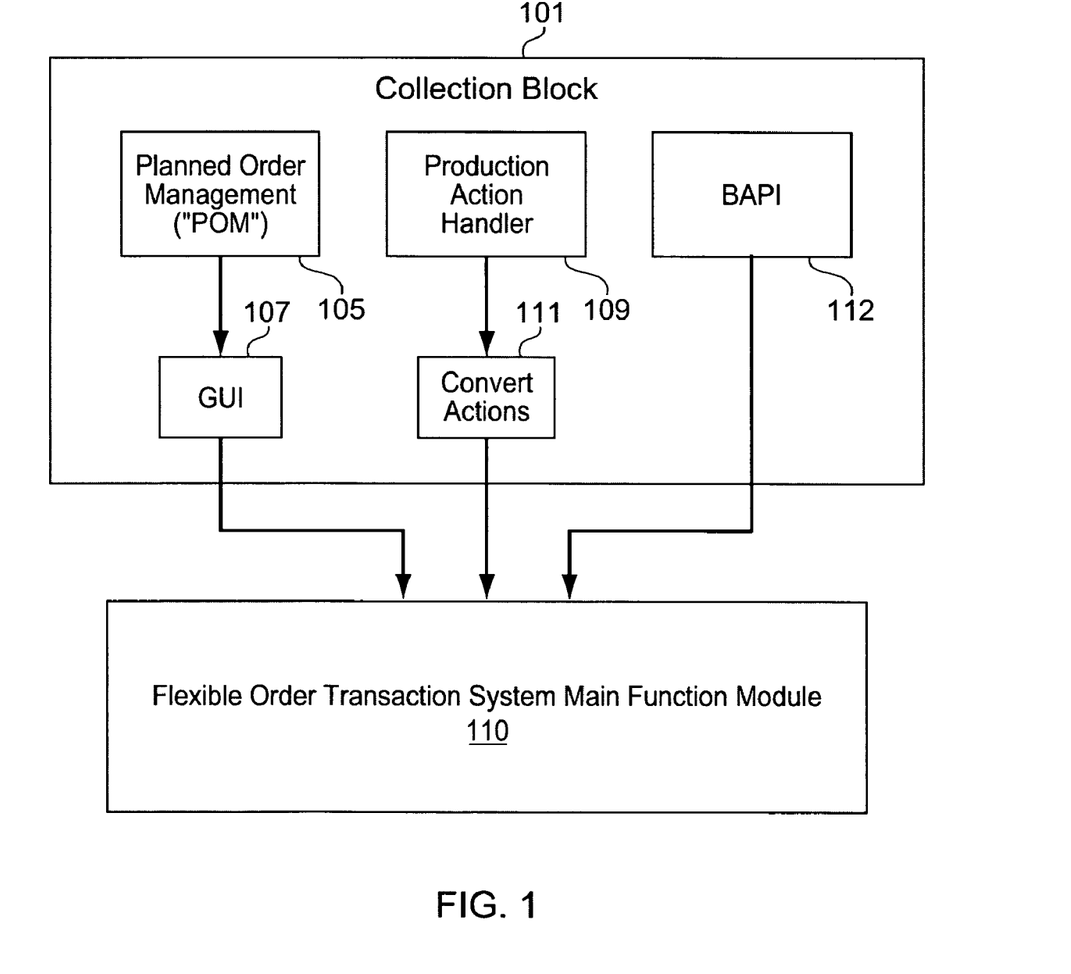
FIG. 1 is a block diagram of shows a block diagram of a system for providing a user interface to a flexible order transaction system ("FOT") according to one embodiment of the present invention.
Figure 4A:
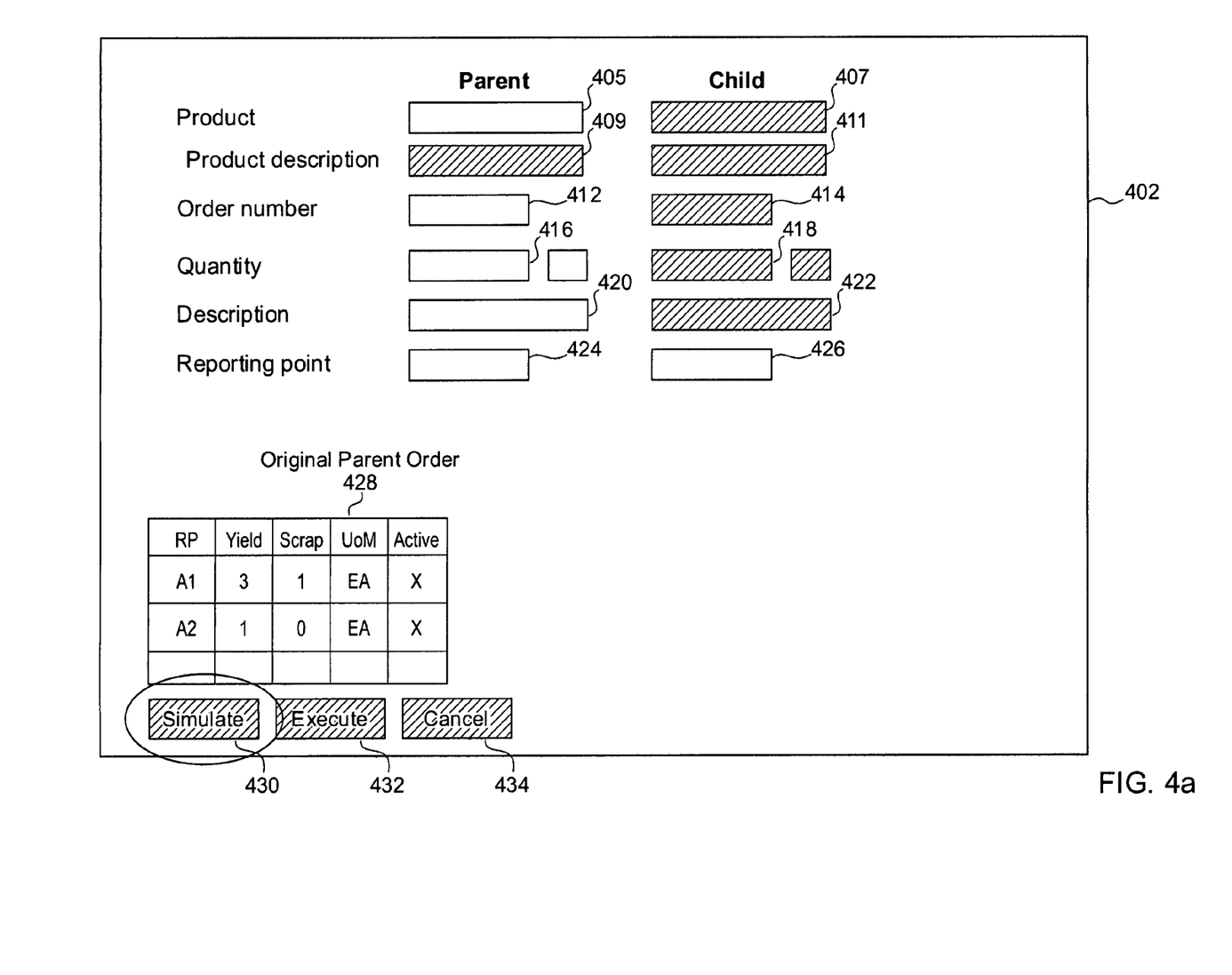
FIG. 4a shows a split interactive screen prior to execution of a simulate function according to one embodiment of the present invention.

FIG. 1 is a block diagram of a system for providing a user interface to a flexible order transaction system ("FOT") according to one embodiment of the quantity fields for parent and child orders (416 and 418 respectively), description fields for parent and child orders (420 and 422 respectively) and reporting point fields for parent and child orders (424 and 426 respectively). Fields shown in grey are those updated by the control order interface system itself and are not user-changeable.

In order to effect a split for a particular order, the user enters a product in product field 405, order number in order number field 412, quantity in quantity field 416, description in description field 420, and reporting points of parent and child in respective fields 424 and 426. The control system fills in fields 407, 409, 411, 414, 418, and 422.

Also shown in FIG. 4a is original parent order window 428. Original parent order window shows table headings for reporting points, yield, scrap, UoM ("Unit of Measure") and Active.

FIG. 4a also shows simulate button 430, execute button 432 and cancel button 434. Selecting cancel button 434 cancels the split. Selecting execute 434 executes the split and calls the corresponding FOT function for order splitting using the data supplied in fields 405-426.

Selecting simulate button 430 allows the user to perform a simulation of the split action in order to experiment with quantities, etc. A subsequent screen (see FIG. 4b) will show the outcome of the split, upon which the user may then decide to actually execute the split, perform another simulation or cancel the split.

Figure 4B:
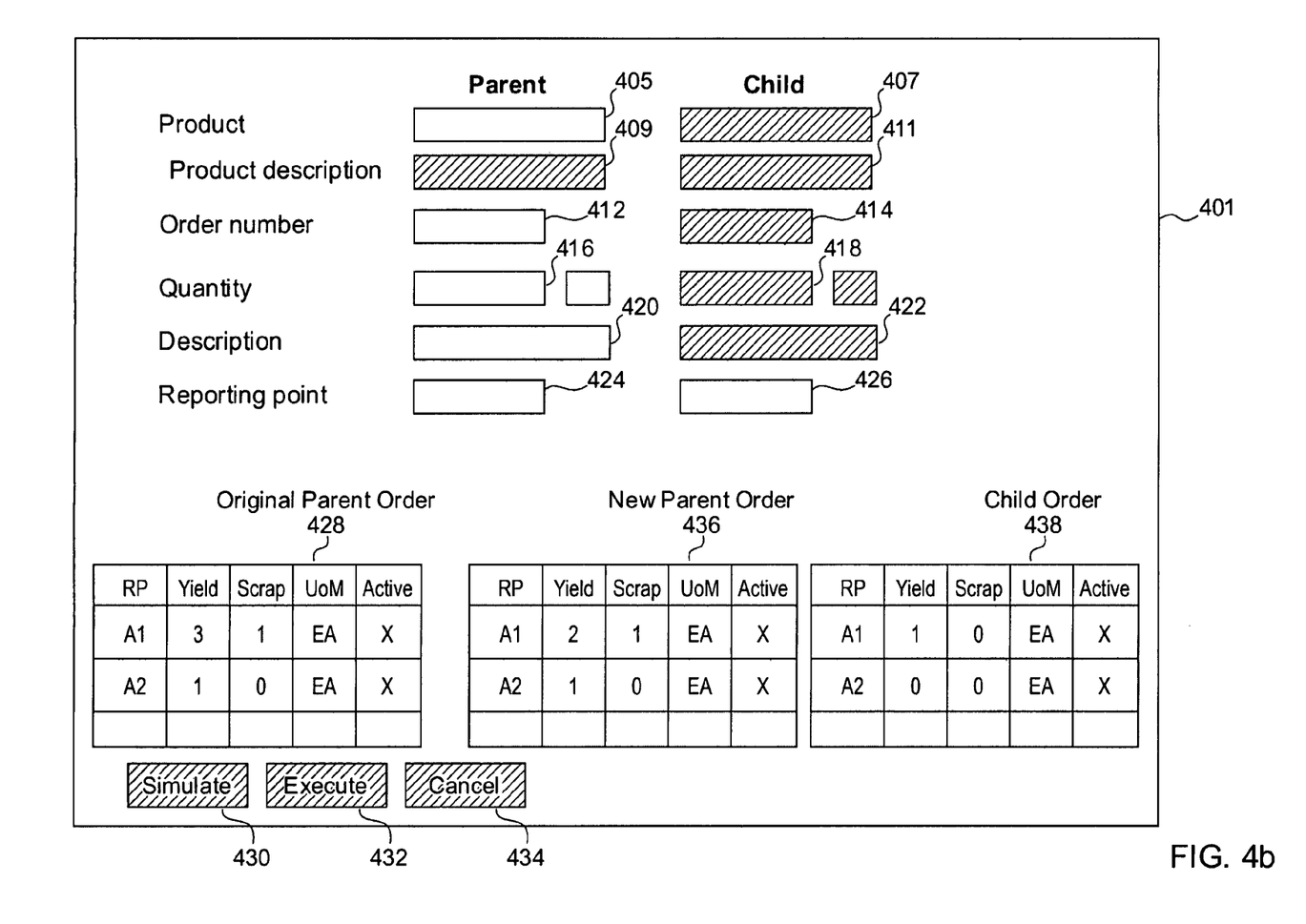
FIG. 4b shows a split interactive screen subsequent to execution of a simulate function according to one embodiment of the present invention.

FIG. 4b shows a split interactive screen subsequent to execution of a simulate function according to one embodiment of the present invention. Note that upon selection of simulate, the user is presented with windows new parent order 436 and child parent order 438. These windows respectively reflect the outcome of a selected split based on the data entered with respect to FIG. 4a. However, as this information is only simulated, new parent order 436 and child order 438 screens provide a user with the opportunity to evaluate the possible outcome of performing such a split.

At this point the user may enter new split data to perform another simulation (by choosing simulate button 430), execute the split (by choosing execute button 432) or cancel (by choosing cancel button 434).

Figure 5:
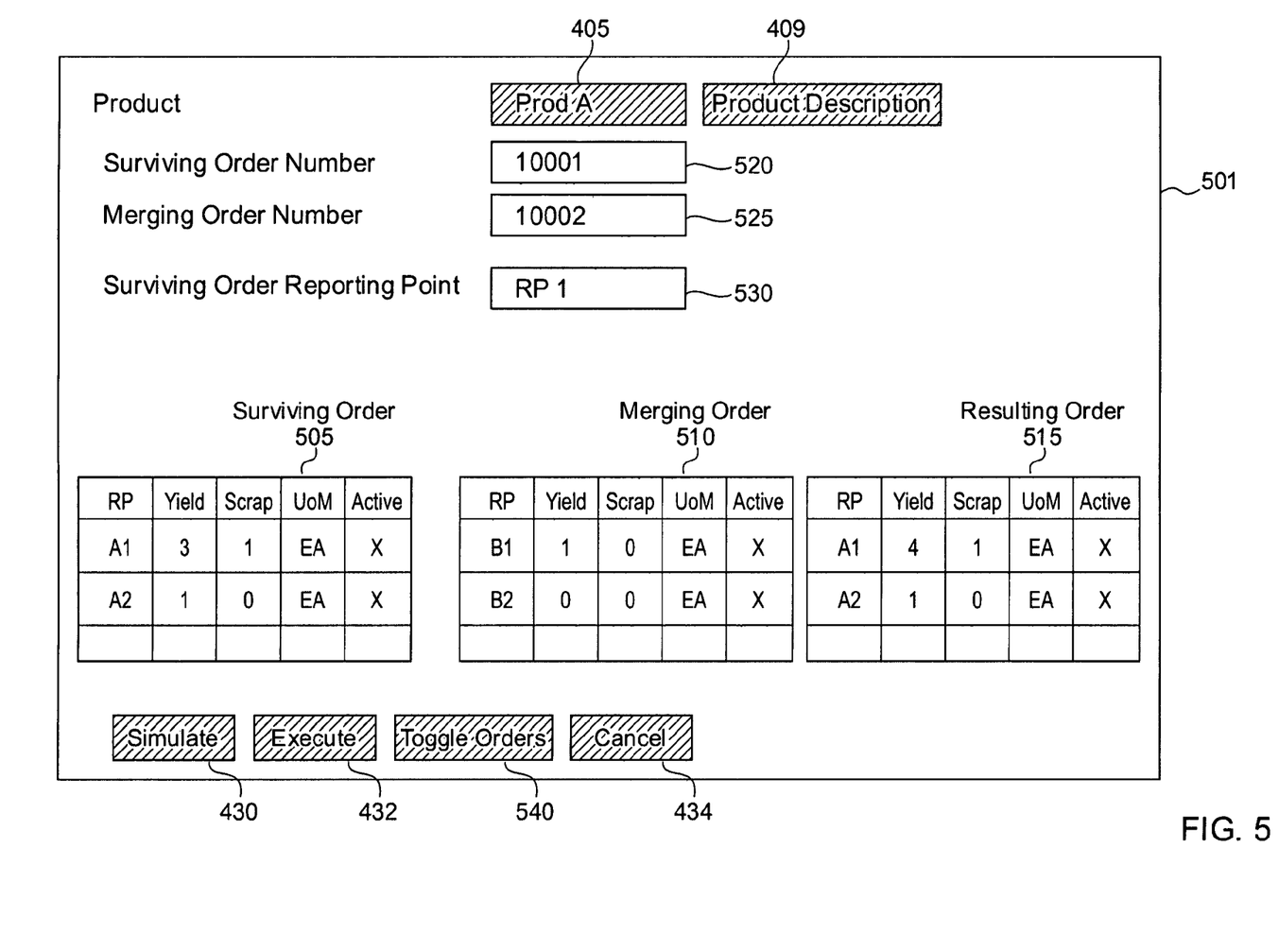
FIG. 5 shows a merge interactive screen according to one embodiment of the present invention.

FIG. 5 shows a merge interactive screen according to one embodiment of the present invention. Merge interactive screen 501 is displayed upon selection of merge FOT function via POM window 205. Merge interactive screen 501 includes product present invention. As shown in FIG. 1, FOT 110 provides sophisticated functions for handling flexible order transactions. These functions may provide for advanced handling or order splits, order merges and order changes. The various systems shown in FIG. 1 may be part of a larger APO system as discussed above.

FIG. 1 shows collection block including POM ("Planned Order Management") 105, GUI 107, PAR ("Production Action Handler") 109, convert actions 111 and BAPI ("Business Application Programming Interface") 112.

POM provides services for showing the status of orders. In addition, POM provides functionality for accessing functions provided by FOT such as order splits, merges and changes. POM provides GUI 107 that allows for access of the services and functions in POM. In particular, as shown in FIG. 1, POM 105 may access functions in FOT 110 via GUI 107.

PAH 109 provides access to FOT function module 110 via convert actions 111. BAPI 112 provides API calls to access FOT functions 110.

Figure 2:
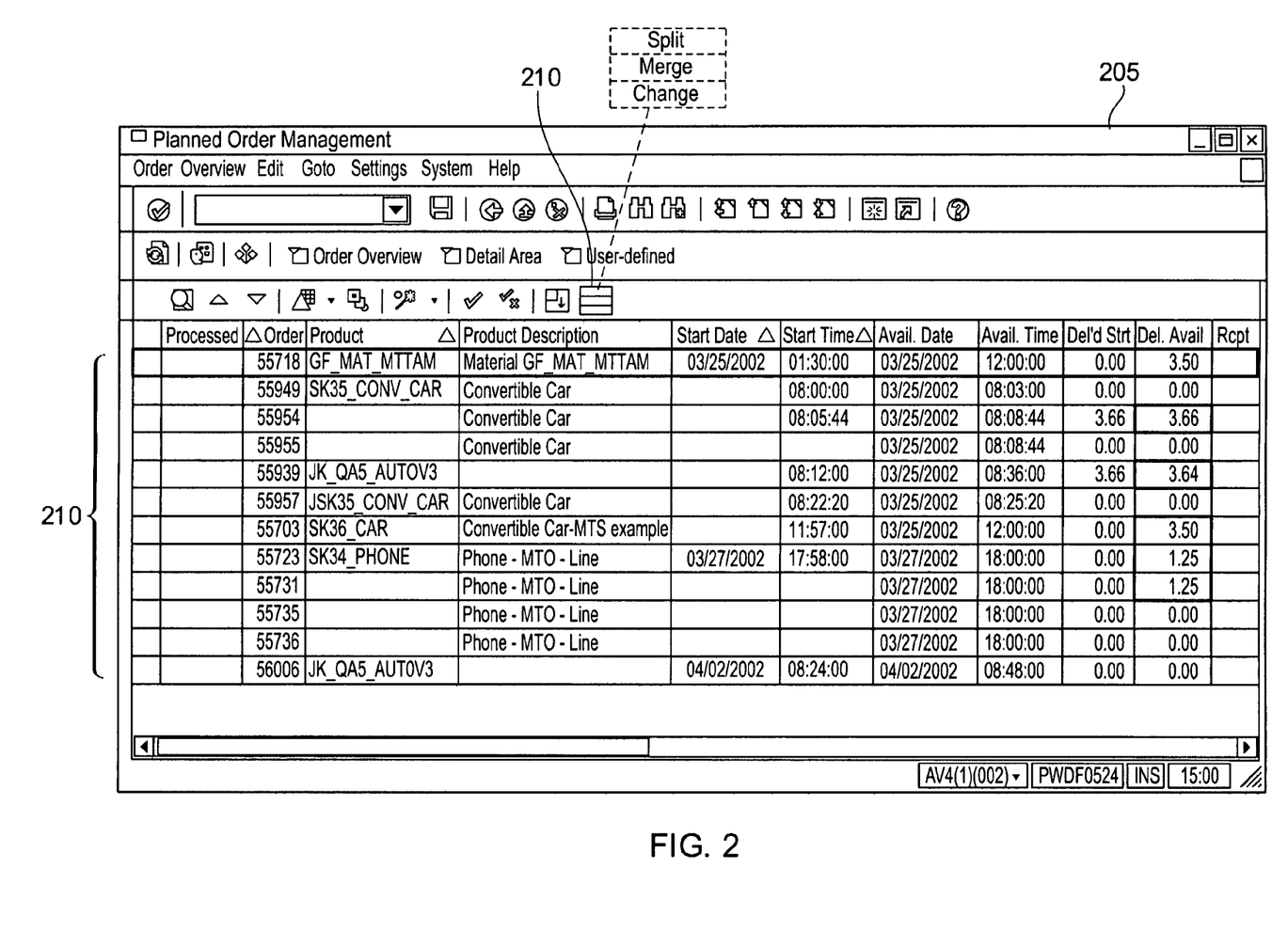
FIG. 2 shows a user interface for accessing functions in a FOT according to one embodiment of the present invention.

FIG. 2 shows a user interface for accessing functions in a FOT according to one embodiment of the present invention. FIG. 2 shows POM window 205. POM window 205 provides graphical display of orders 210 and associated information such as product, product description, etc. In addition POM window includes FOT function selection button 215. Using POM window 205, a user may select particular orders for processing via FOT functions. Selection button 215 then allows a user to select particular FOT functions to be executed on orders chosen via POM window 205.

Figure 3:
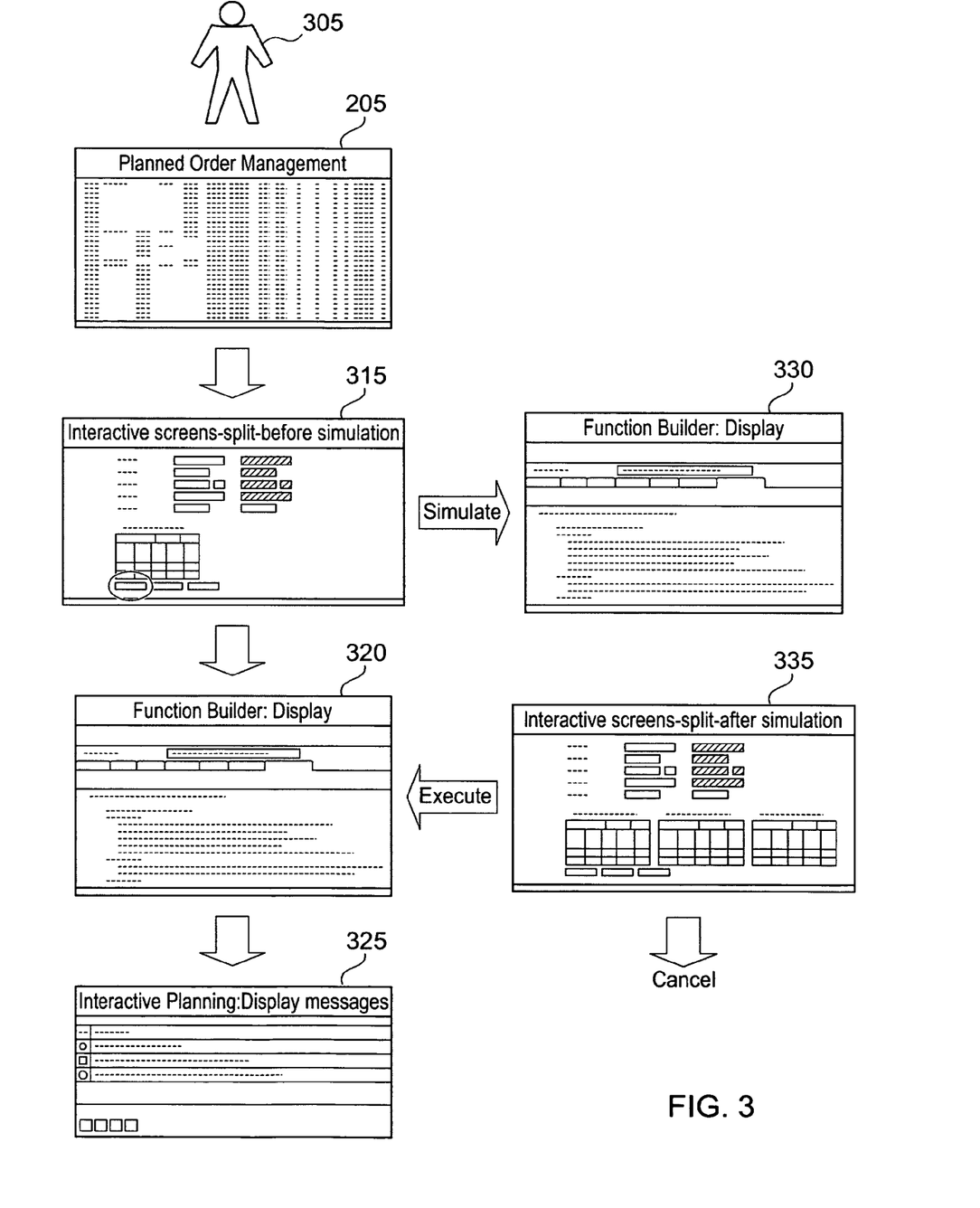
FIG. 3 shows an exemplary interaction with a control system interface in order to access FOT functions according to one embodiment of the present invention.

FIG. 3 shows an exemplary interaction with a control system interface in order to access FOT functions according to one embodiment of the present invention. User 305 selects orders for processing via POM window 205 (see FIG. 2).

Upon choosing selection button 215, user 305 may select particular FOT functions 110 to be executed. In particular, with respect to FIG. 3 and for illustrative purposes only, it is assumed that user 305 has selected a split function included in FOT 110. Upon this selection, interactive screen 315 is displayed to user 305.

FIG. 4*a* shows a split interactive screen prior to execution of a simulate function according to one embodiment of the present invention. Pre-simulate split screen 401 is shown upon selection of merge FOT function from POM window 205. Pre-simulate split screen 401 includes product field for parent and child orders (405 and 407 respectively), product description fields for parent and child orders (409 and 411 respectively), order number of parent and child orders (412 and 414) respectively, quantity fields for parent and child orders (416 and 418 respectively), description fields for parent and child orders (420 and 422 respectively) and reporting point fields for parent and child orders (424 and 426 respectively). Fields shown in grey are those updated by the control order interface system itself and are not user-changeable. Reporting points are times during a production process at which a production management system may receive reporting regarding the status of processing up to that point.

The user may enter a surviving order number in surviving order number field 520 and a merge order number in merge order number field 525. In addition, the user selects a surviving order reporting point by entering the appropriate information in surviving order reporting point field 530. Note that corresponding product and product description are respectively displayed in product fields 405 and 409.

The user may then simulate the merge using simulate button 430. The simulate function operates identically to the operation described with respect to FIGS. 4*a*-4*b*. In addition, the user may execute the merge via button 432, cancel the order via cancel button 434 or toggle orders via toggle orders button 540.

Surviving order window 505, merging order window 510 and resulting order window 515 are respectively display upon selection of a merge operation.

Figure 6:
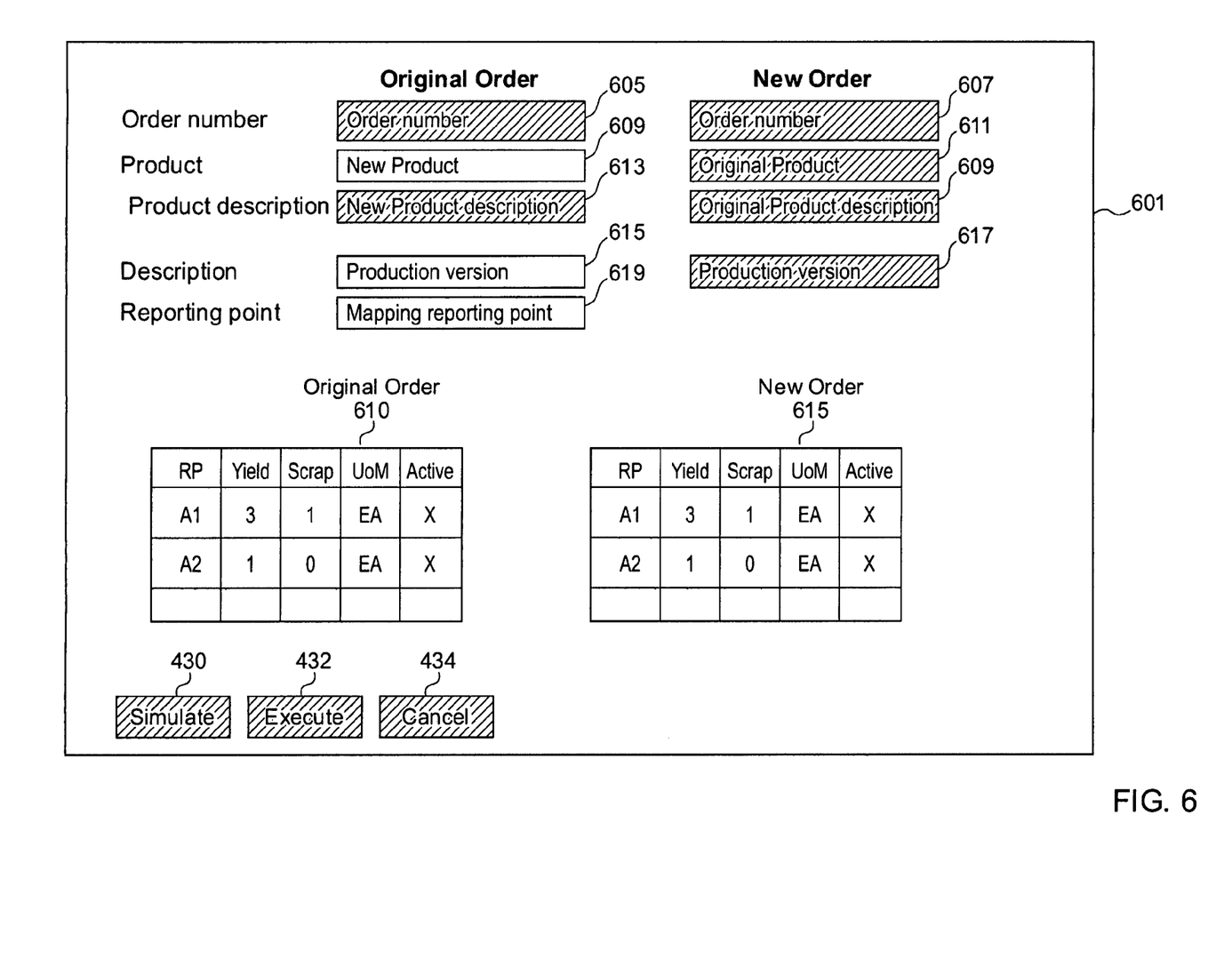
FIG. 6 shows a change order interactive screen according to one embodiment of the present invention.

FIG. 6 shows a change order interactive screen according to one embodiment of the present invention. Change order interaction screen 601 includes the order fields of order number 605, product 609, product description 613, description 615 and mapping reporting point 619. Change order interaction screen 601 also includes corresponding fields for the original order (607, 611, 609 and 617) referring to order number, original production, original product description and production version 617 respectively.

What is claimed is:

1. A computer-readable storage medium having computer program instructions, which when executed by a processor implement a control system interface for providing access to a flexible order transaction (FOT) system comprising:
   an order selection control for selecting at least one order;
   a FOT function selection control for selecting at least one FOT function to be performed on the at least one order;
   at least one interactive screen corresponding to each of the at least one FOT function;
   wherein the control system interface provides access to a selected FOT function through a corresponding interactive screen, the FOT selection control allows selection of a split order function, and the split order function:
   receives a request to split an order, the request specifying a child order quantity for a child order; and
   transfers, at a mapped pair of reporting points, at least one of a split yield quantity, a split scrap quantity, and a work-in-progress quantity from the order to the child order as a function of the child order quantity and at least one of a yield quantity, a scrap quantity, and a work-in-progress quantity of the order, wherein the reporting points represent times during production of the order and child order.

2. The computer-readable storage medium of claim 1, wherein the interactive screen allows for receipt of a designated order number, a quantity, a parent reporting point and a child reporting point.

3. The computer-readable storage medium of claim 1, wherein the interactive screen shows information corresponding to a parent reporting point, yield and scrap for the order.

4. The computer-readable storage medium of claim 1, wherein the interactive screen provides a selection control for choosing a simulate function for simulating an order split.

5. The computer-readable storage medium of claim 2, wherein the split order function:
   determines at least one of a yield quantity, a scrap quantity, and a work-in-progress quantity at each reporting point in a first production process for the order, the first production process including a plurality of reporting points; and maps at least two pairs of reporting points between the first production process for the order and a second production process for the child order, the second production process including a plurality of reporting points.

6. A system for performing transactions comprising:
- a processor configured to execute computer program instructions to provide a plurality of flexible order transaction (FOT) functions via a control system interface including:
  - an order selection control for selecting at least one order;
  - a FOT function selection control for selecting at least one FOT function to be performed on the at least one order;
  - at least one interactive screen corresponding to each of the at least one FOT function;
  - wherein the control system interface provides access to a selected FOT function through a corresponding interactive screen, the FOT selection control allows selection of a split order function, and the split order function:
    - receives a request to split an order, the request specifying a child order quantity for a child order; and
    - transfers, at a mapped pair of reporting points, at least one of a split yield quantity, a split scrap quantity, and a work-in-progress quantity from the order to the child order as a function of the child order quantity and at least one of a yield quantity, a scrap quantity, and a work-in-progress quantity of the order, wherein the reporting points represent times during production of the order and child order.

7. The system according to claim 6, wherein the split order function:
- determines at least one of a yield quantity a scrap quantity and a work-in-progress quantity at each reporting point in a first production process for the order, the first production process including a plurality of reporting points; and
- maps at least two pairs of reporting points between the first production process for the order and a second production process for the child order, the second production process including a plurality of reporting points.

8. A method for providing access to a flexible order transaction (FOT) system comprising providing:
- an order selection control, of a control system interface, for selecting at least one order;
- a FOT function selection control, of the control system interface, for selecting at least one FOT function to be performed on the at least one order;
- at least one interactive screen, of the control system interface, corresponding to each of the at least one FOT function;
- wherein the control system interface provides access to a selected FOT function through a corresponding interactive screen, the FOT selection control allows selection of a split order function, and the split order function:
  - receives a request to split an order, the request specifying a child order quantity for a child order; and
  - transfers, at a mapped pair of reporting points, at least one of a split yield quantity, a split scrap quantity, and a work-in-progress quantity from the order to the child order as a function of the child order quantity and at least one of a yield quantity, a scrap quantity, and a work-in-progress quantity of the order, wherein the reporting points represent times during production of the order and child order.

9. The method according to claim 8, wherein the split order function:
- determines at least one of a yield quantity a scrap quantity and a work-in-progress quantity at each reporting point in a first production process for the order, the first production process including a plurality of reporting points; and
- maps at least two pairs of reporting points between the first production process for the order and a second production process for the child order, the second production process including a plurality of reporting points.

10. A computer-readable storage medium having computer program instructions, which when executed by a processor implement a control system interface for providing access to a flexible order transaction (FOT) system comprising:
- an order selection control for selecting at least one order;
- a FOT function selection control for selecting at least one FOT function to be performed on the at least one order; and
- at least one interactive screen corresponding to each of the at least one FOT function,
- wherein the FOT selection control allows selection of a split order function, the interactive screen corresponding to the split order function provides a simulation selection control for selecting a simulate function for simulating an order split, and
- wherein selection of the simulation selection control triggers performing a simulation of the order split and display of a simulation result of the simulation.

11. The computer-readable storage medium of claim 10, wherein the interactive screen allows for receipt of a designated order number, a quantity, a parent reporting point and a child reporting point, wherein the parent and child reporting points represent times during production of the order and child order.

12. The computer-readable storage medium of claim 10, wherein the interactive screen shows information corresponding to a parent reporting point, yield and scrap for a parent order.

13. A computer-readable storage medium having computer program instructions, which when executed by a processor implement a control system interface for providing access to a flexible order transaction (FOT) system comprising:
- an order selection control for selecting at least one order;
- a FOT function selection control for selecting at least one FOT function to be performed on the at least one order; and
- at least one interactive screen corresponding to each of the at least one FOT function,
- wherein the control system interface provides access to a selected FOT function through a corresponding interactive screen, the FOT selection control allows selection of a split order function, the interactive screen allows for receipt of a designated order number, a quantity, and a reporting point representing times during production of the order, and the split order function:
  - receives a request to split the order, the request specifying a child order quantity for a child order;
  - determines at least one of a yield quantity, a scrap quantity, and a work-in-progress quantity at each reporting point in a first production process for the order, the first production process including a plurality of reporting points;
  - maps at least two pairs of reporting points between the first production process for the order and a second production process for the child order, the second production process including a plurality of reporting points; and transfers at each mapped pair of reporting points, at least one of a split yield quantity, a split scrap quantity, and a work-in-progress quantity from the order to the child order as a function of the child order quantity and at least one of the yield quantity, the scrap quantity, and the work-in-progress quantity.

14. The computer-readable storage medium of claim 13, wherein the interactive screen provides a selection control for choosing a simulate function for simulating an order split.

15. A computer-implemented method, comprising:

displaying an order selection control, of a control system interface of a flexible order transaction (FOT) system, for selecting at least one order;

displaying a FOT function selection control, of the control system interface, for selecting at least one FOT function to be performed on the at least one order, wherein the at least one FOT function includes a split order function;

responsive to a selecting of the split order function using the FOT function selecting control, displaying an interactive screen corresponding to the split order function, the interactive screen including a simulation selection control for selecting a simulation of an order split;

responsive to a selecting of the simulation selection control, performing a simulation of the order split; and displaying a simulation result of the simulation of the order split.

* * * * *

UNITED STATES PATENT AND TRADEMARK OFFICE
CERTIFICATE OF CORRECTION

PATENT NO. : 7,571,118 B2
APPLICATION NO. : 10/850814
DATED : August 4, 2009
INVENTOR(S) : Alam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1382 days.

Signed and Sealed this

Seventh Day of September, 2010

David J. Kappos
*Director of the United States Patent and Trademark Office*